(12) United States Patent
Wu et al.

(10) Patent No.: US 8,213,803 B2
(45) Date of Patent: Jul. 3, 2012

(54) METHOD AND SYSTEM FOR LASER BASED COMMUNICATION

(75) Inventors: Yeong-wei A. Wu, Rancho Palos Verdes, CA (US); Ketao Liu, Cerritos, CA (US)

(73) Assignee: The Boeing Company, Chicago, IL (US)

(*) Notice: Subject to any disclaimer, the term of this patent is extended or adjusted under 35 U.S.C. 154(b) by 927 days.

(21) Appl. No.: 12/128,857

(22) Filed: May 29, 2008

(65) Prior Publication Data

US 2009/0324236 A1    Dec. 31, 2009

(51) Int. Cl.
*H04B 10/00* (2006.01)

(52) U.S. Cl. .................... 398/129; 398/130; 398/131

(58) Field of Classification Search ........... 398/118–131
See application file for complete search history.

(56) References Cited

U.S. PATENT DOCUMENTS

| | | | |
|---|---|---|---|
| 6,195,044 B1 * | 2/2001 | Fowell | 342/367 |
| 6,285,927 B1 | 9/2001 | Li et al. | |
| 6,504,502 B1 * | 1/2003 | Wu et al. | 342/354 |
| 2004/0098177 A1 * | 5/2004 | Needelman et al. | 701/4 |
| 2006/0149474 A1 * | 7/2006 | Needelman et al. | 701/222 |

* cited by examiner

*Primary Examiner* — Dzung Tran
(74) *Attorney, Agent, or Firm* — Yee & Associates, P.C.

(57) ABSTRACT

Method and system for determining a point-ahead angle from a first spacecraft to a second spacecraft, each spacecraft having a laser communication ("lasercom") terminal is provided If ephemeris data regarding the second spacecraft is unavailable to the first spacecraft while the second spacecraft is mobile, (a) obtaining attitude information regarding the first spacecraft; and (b) obtaining gimbal offload commands from a fast steering mirror and a first spacecraft telescope subsystem of the first spacecraft; wherein a point-ahead determination module receives the attitude information and the gimbal offload commands; and determining an estimate of the point-ahead angle from the first spacecraft to the second spacecraft based on the attitude information and the gimbal offload commands.

21 Claims, 8 Drawing Sheets

METHOD AND SYSTEM FOR LASER BASED COMMUNICATION

BACKGROUND

1. Technical Field

The present description relates to spacecraft communication systems.

2. Related Art

Laser based communication systems (also referred to as "lasercom systems" or "lasercom terminals") may be used for communication between different spacecrafts (or platforms), for example, a satellite and an airborne, mobile aircraft. The term spacecraft as used herein includes satellites, space shuttles, aircraft and other platforms. For this disclosure, the international space station may also be considered as a spacecraft.

Typically, a lasercom terminal transmits and receives a laser signal to enable communication between two or more platforms (for example, a satellite and an aircraft). Lasercom communication beams are typically narrow and have to be precisely directed at a target platform. For this example, if a satellite has to communicate with an aircraft (target), then the narrow laser beam from the satellite has to be accurately directed at the aircraft.

Typically, lasercom terminals use a two phased process to communicate. The first phase is an acquisition phase and the second phase is a tracking phase. During the acquisition phase, a lasercom terminal (for example, at a satellite) acquires a target (for example, an airborne aircraft). After the aircraft is "acquired", the second phase is used to track the mobile aircraft (referred to as "tracking").

Typically, during the acquisition phase, the laser beam has a larger field of view compared to the field of view during the tracking phase. For a geo-synchronized satellite tracking an aircraft platform, the tolerable error in transmitting a laser beam during the acquisition phase may be about 100 micro radians. Since the beam width during the tracking phase is narrower, the tolerable error in directing a laser beam is only about 0.5 micro radians. Hence, for effectively tracking a target, a transmitting lasercom terminal has to accurately point the laser beam at the receiving terminal of the target.

Due to the finite speed of light, it will take a finite amount of time for a transmitted beam from the transmitting lasercom terminal to reach the receiving lasercom terminal. Hence, for accurately pointing the transmitting beam at the target, the apparent angle or point-ahead angle between the transmitting terminal and the receiving terminal should be included in a pointing command for the transmitted beam.

To accurately compute the point-ahead angle, the transmitting lasercom terminal should have accurate knowledge of the relative velocity of the receiving lasercom terminal at a mobile platform (for example, a mobile aircraft). When the receiving lasercom terminal is on a satellite platform, its velocity may be determined by the ephemeris data of the satellite. However, when the lasercom terminal is on an aircraft (or any other mobile platform), it is difficult to accurately determine the relative velocity because updated aircraft ephermis data may not be available to a satellite at all times and the flight pattern of the aircraft may change. Hence, it is a challenge for a transmitting lasercom terminal to determine a point-ahead angle of a mobile platform, when ephermis data is unavailable.

Therefore, for effective communication with a mobile platform, there is a need for a method and system to efficiently determine a point-ahead angle so that a transmitting lasercom terminal (for example, in a satellite) can accurately point a laser beam at a mobile platform (for example, an aircraft.

SUMMARY

In one embodiment a method for determining a point-ahead angle from a first spacecraft to a second spacecraft each spacecraft having a laser communication ("lasercom") terminal is provided. If ephemeris data regarding the second spacecraft is unavailable to the first spacecraft while the second spacecraft is mobile, (a) obtaining attitude information regarding the first spacecraft; and (b) obtaining gimbal offload commands from a fast steering mirror and a first spacecraft telescope subsystem of the first spacecraft; wherein a point-ahead determination module receives the attitude information and the gimbal offload commands; and determining an estimate of the point-ahead angle from the first spacecraft to the second spacecraft based on the attitude information and the gimbal offload commands.

In another embodiment, a method for determining a point-ahead angle from a first spacecraft to a second spacecraft, each spacecraft having a lasercom terminal is provided. The method includes acquiring initial ephemeris data of the second spacecraft at an initial position; determining if the ephemeris data of the second spacecraft is available, after the second spacecraft has moved from the initial position; and if the ephemeris data of the second spacecraft at the new position is unavailable, determining a point-ahead angle based on ephemeris data of the first spacecraft.

In yet another embodiment, a system for determining a point-ahead angle is provided. The system includes a first spacecraft having a lasercom terminal; and a second spacecraft having a lasercom terminal, wherein the first spacecraft and the second spacecraft communicate with each other and the point-ahead angle is determined from the first aircraft to the second aircraft; and wherein the first spacecraft includes a point-ahead determination module for estimating the point-ahead angle based on attitude information of the first spacecraft and gimbal offload commands obtained from a fast steering mirror and a first spacecraft telescope subsystem of the first spacecraft.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures.

DETAILED DESCRIPTION

Definitions: The following definitions are provided as they are typically (but not exclusively) used in field of aeronautics, implementing the various adaptive embodiments disclosed herein.

"Acquisition Phase" means a phase during which a spacecraft acquires information regarding a target.

"Lasercom System" means a laser based communication system used by spacecrafts, including mobile platforms. A lasercom system includes a transmit segment for transmitting a laser beam and a receive segment for receiving a laser beam.

"Mobile Platform" means a spacecraft that is moving relative to another spacecraft. An example of a mobile platform is an airborne aircraft that moves relative to, for example, a satellite.

"Point-ahead Angle" means an angle used by a lasercom terminal to transmit a laser beam to a mobile platform, when the mobile platform moves from a first location to a second location.

"Spacecraft" means satellites, space shuttles, nano-satellites, free-flying satellites, aircrafts or other similar platforms.

"Target" means a platform that is acquired and tracked by a spacecraft. For example, when a satellite communicates with an aircraft, then the aircraft becomes a target for the satellite.

"Tracking Phase" means a phase during which a mobile platform is tracked by a spacecraft. The tracking phase typically occurs after the acquisition phase.

The present disclosure provides a method and system for determining a point-ahead angle for a mobile platform, especially when ephermis data for the mobile platform may not be available for a transmitting lasercom terminal. It is to be understood that although the present disclosure has been described with reference to a mobile platform, i.e., an aircraft, and a geo-stationary platform, i.e., a satellite, the communication system described herein may be used by other platforms.

To facilitate an understanding of the various embodiments, the general architecture and operations of a communication system and spacecraft subsystems will be described. The specific architecture and operation of the various embodiments will then be described with reference to the general architecture.

Figure 1:
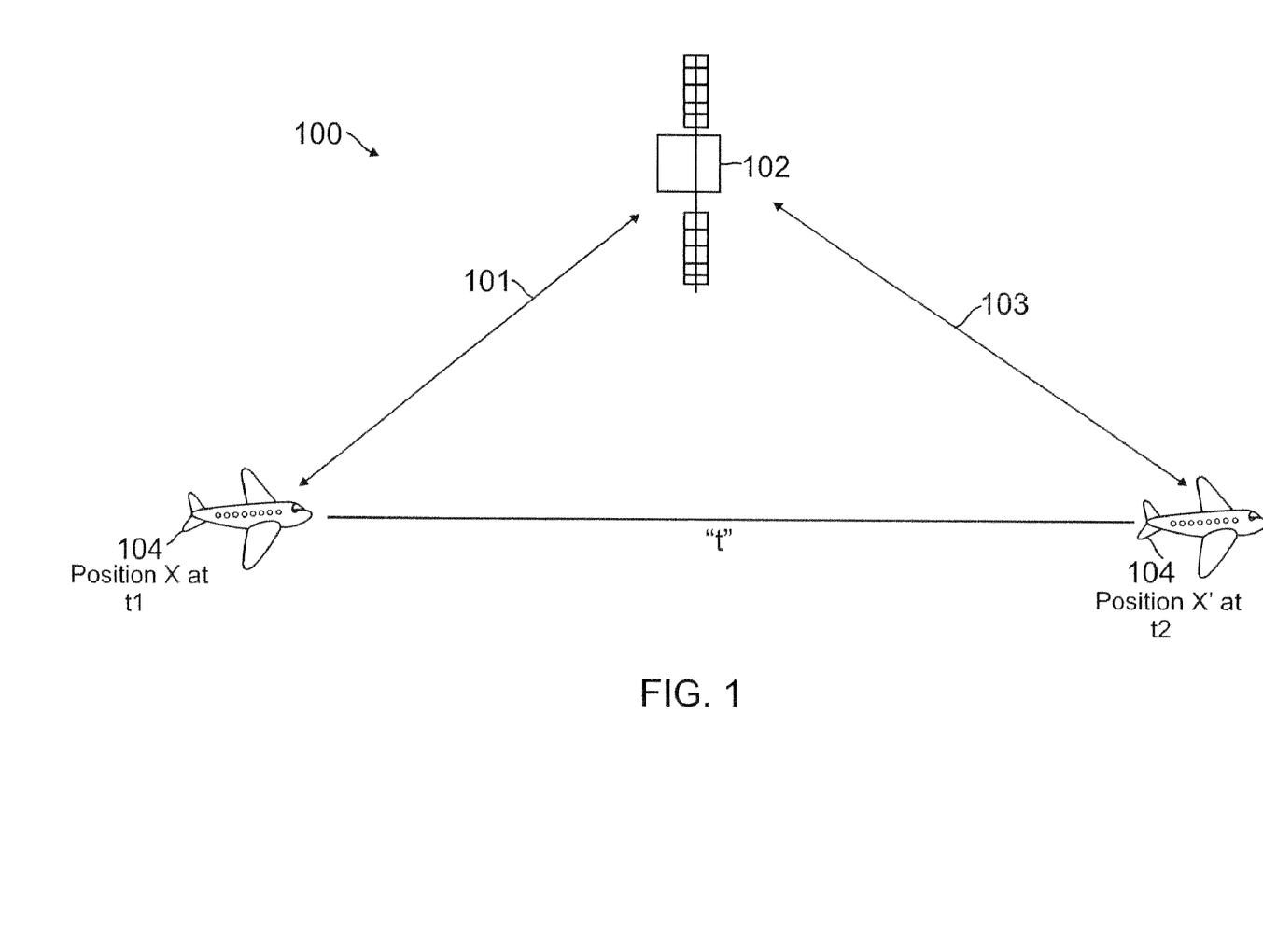
FIG. 1 shows a spacecraft (satellite) communicating with a mobile platform (airborne aircraft), using the embodiments of the present disclosure.

Communication System:

FIG. 1 shows a communication system 100 with a satellite 102 communicating with a moving aircraft 104. Both satellite 102 and aircraft 104 include lasercom terminals (not shown) for transmitting and receiving laser beams.

Initially, during an acquisition phase, satellite 102 acquires information regarding aircraft 104 via laser beam 101. During the acquisition phase, aircraft 104 is located at location X at time t1. After time "t" has elapsed, aircraft 104 is at location X' at time t2. Satellite 102 uses laser beam 103 to communicate with aircraft 104 at location X'.

To accurately transmit laser beam 103, the lasercom system of satellite 102, should accurately know location X' before the aircraft reaches location XA. Hence, it is desirable for satellite 102 to be aware of a point-ahead angle before time t2 so that laser beam 103 may point accurately towards aircraft 104 at time t2. This becomes a challenge when satellite 102 does not have updated ephermis data for aircraft 104.

In one embodiment, a method and system for determining a point-ahead angle when the ephemeris data of a mobile platform (for example, an aircraft) is not available at all times is provided. Attitude and ephemeris data of the spacecraft (for example, a satellite) along with a velocity vector of the mobile platform with respect to the spacecraft are used to determine the point-ahead angle.

Spacecraft Subsystems:

A spacecraft may include various subsystems to perform various functions. Generally, at a higher level, a spacecraft includes an inertial reference subsystem, an optical subsystem and a computer subsystem. The inertial reference subsystem uses gyros and attitude sensors to determine spacecraft orientation or attitude in an inertial space.

The optical system (may also be referred to as "space telescope subsystem" or "STS") includes a gimbal assembly, an optical telescope assembly, and an electronic system that sends optical data to the computer subsystem for communication and navigation purposes. The gimbal assembly includes dual-axis gimbals, resolvers, and torquers providing motion for the optical telescope to cover a field-of-regard. The optical telescope assembly includes a fast steering mirror (FSM), a point-ahead mirror (PAM), an acquisition/tracking sensor or tracking nutator sensor, an optical receiver, and an optical transmitter. The spacecraft computer system communicates with the other subsystems, receives information from the other subsystems; and analyzes data from the other subsystems.

Spacecraft Control Processor

Figure 2A:
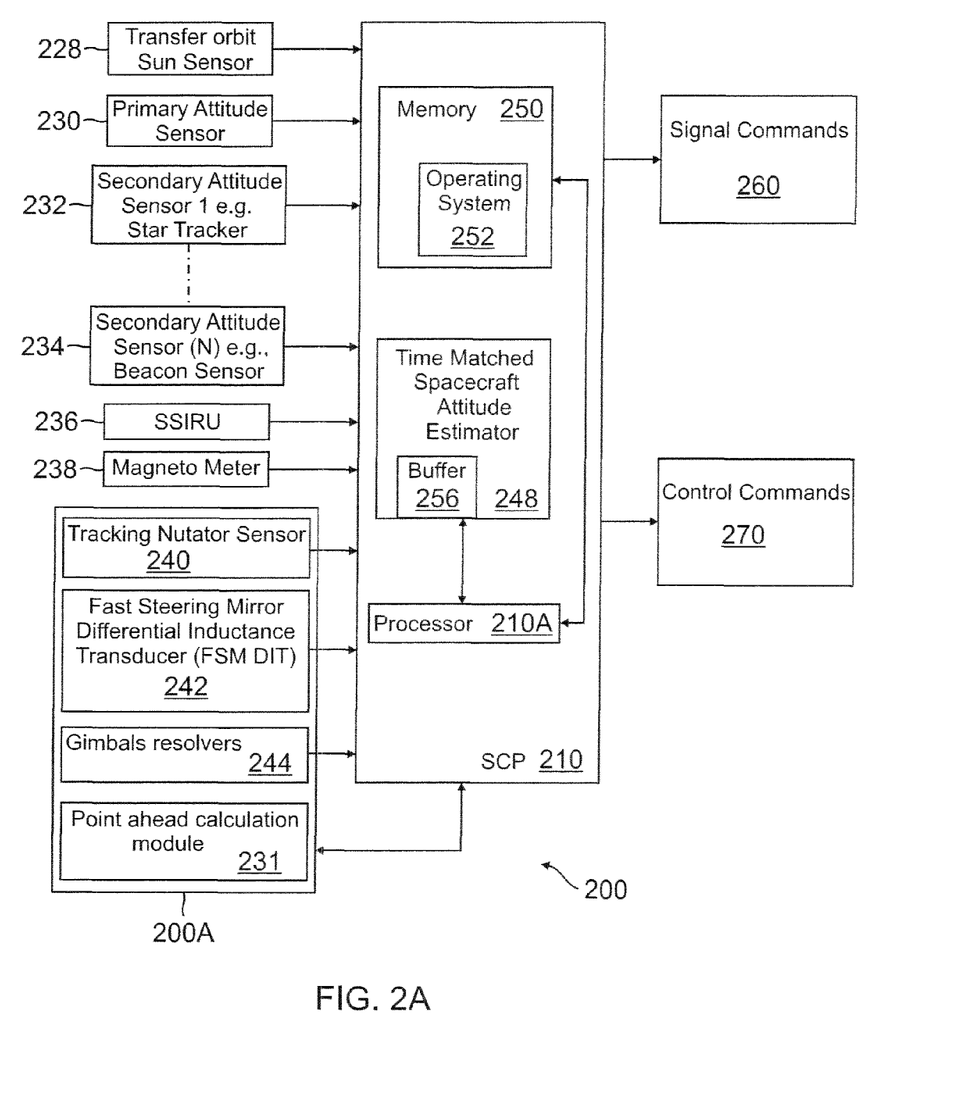
FIG. 2A is a block diagram shows a system using a satellite system using a Spacecraft Control Processor (SCP), according to one embodiment.

FIG. 2A shows a block diagram of a system 200 used in a satellite (102, FIG. 1) with a Spacecraft Control Processor (SCP) 210 interfacing with various modules, including a point-ahead calculation module 231 (may also be referred to as module 231), described below in detail. SCP 210 receives various inputs and outputs signal commands 260 and control commands 270, as described below.

SCP 210 includes a general-purpose processor 210A that interfaces with memory 250, such as a random access memory (RAM). Generally, SCP 210 operates under control of an operating system 252 executed by processor 210. Applications executed by processor 210A access and manipulate data stored in memory 250.

In one embodiment, instructions implementing the operating system 252, application programs, and other modules are tangibly embodied in a computer-readable medium, e.g., data storage device, which could include a RAM, FEPROM, or other memory device. Further, the operating system 252 and the computer program are comprised of instructions which, when read and executed by SCP 210, cause the spacecraft processor 210A to perform steps for implementing and/or using the present embodiments. Computer program and/or operating instructions may also be tangibly embodied in memory 250 and/or data communications devices (e.g. other devices), thereby making a computer program product or article of manufacture according to the disclosure. As such, the terms "program storage device," "article of manufacture" and "computer program product" as used herein is intended to encompass a computer program accessible from any computer readable device or media SCP 210 receives input from a plurality of modules and performs various functions, including post ejection sequencing, transfer orbit processing, acquisition control, station keeping control, normal mode control, mechanisms control, fault protection, and spacecraft systems support, among others.

The post ejection sequencing may include initializing to an ascent mode and thruster active nutation control (TANC). The transfer orbit processing may include attitude data processing, thruster pulse firing, perigee assist maneuvers, and liquid apogee motor (LAM) thruster firing. The acquisition control may include idle mode sequencing, sun search/acquisition, and Earth search/acquisition. The "station keeping control" may include auto mode sequencing, gyro calibration, station keeping attitude control and transition to normal.

The normal mode control may include attitude estimation, attitude and solar array steering, momentum bias control, magnetic torquing, and thruster momentum dumping (H-dumping). The mechanisms mode control may include solar panel control and reflector positioning control. The spacecraft control systems support may include tracking and command processing, battery charge management and pressure transducer processing.

SCP 210 receives inputs from a primary attitude sensor 230 such as a gyroscope (i.e., inertial sensor), and one or more secondary sensors for example, an earth sensor (not shown), a sun sensor (not shown), a star tracker (shown as 232), or beacon sensor (i.e., attitude "position" sensors, shown as 234).

Figure 3:
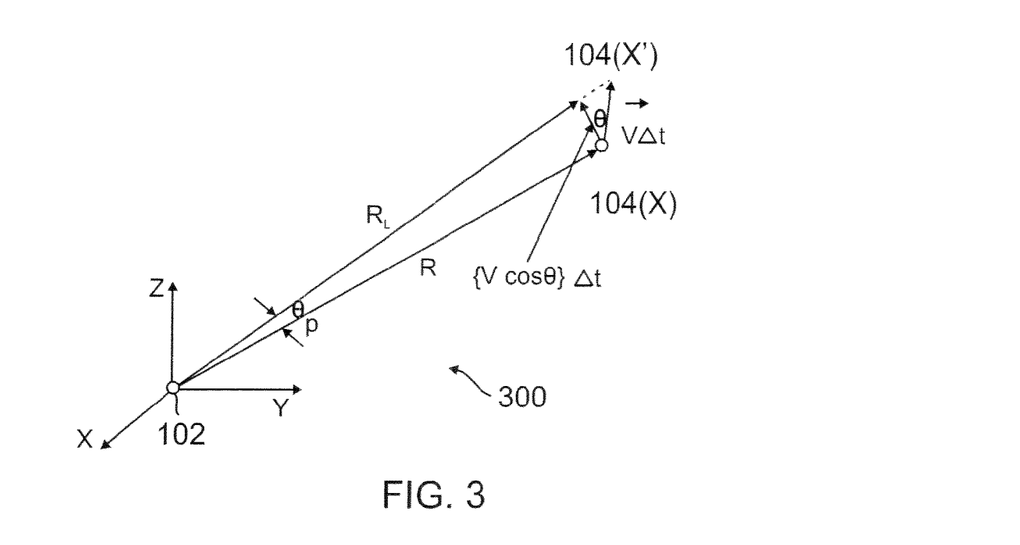
FIG. 3 shows a geometrical diagram for determining a point-ahead angle from a satellite, according to one embodiment.

The primary attitude sensor 230 located on satellite 102 measures rotational rates experienced by the satellite 102 relative to the satellites frame of reference (for example the orthogonal axis X, Y and Z shown in FIG. 3). The rotational rates are used to determine a direction cosine matrix. Similarly, secondary attitude sensors 232 and 234 provide a reference measurement for a secondary source (for example, a star, sun, earth and others).

The primary attitude sensor 230 generates an attitude state/output, and the secondary attitude sensors 232, 234 generate corrections to the attitude state/output. The primary and secondary attitude sensors 230, 232, 234 provide attitude data to SCP 210 with an associated time stamp. The time stamps are used by time matched spacecraft attitude estimator module 248 (or module 248) to determine and update attitude corrections. Module 248 tracks updated attitude of the satellite and stores it in a memory storage space (shown as buffer 256).

SCP 210 also receives inputs from satellite telescope subsystem 200A that includes a gimbaled telescope 225, a tracking nutator sensor 240, a fast steering mirror 242, a gimbal resolver 244, the point-ahead calculation module 231, and other optical transmitters and receivers. Subsystem 200A is described below in detail with respect to FIG. 2B.

Based on various inputs, SCC 210 generates signal commands 260 and control commands 270 for controlling satellite functions and subsystems. Signal commands 260 include bus attitude estimate, and STS gimbal pointing commands. Control commands 270 regulate speed, direction, movement and internal functioning of the satellite.

Satellite Telescope Subsystem

Figure 2B:
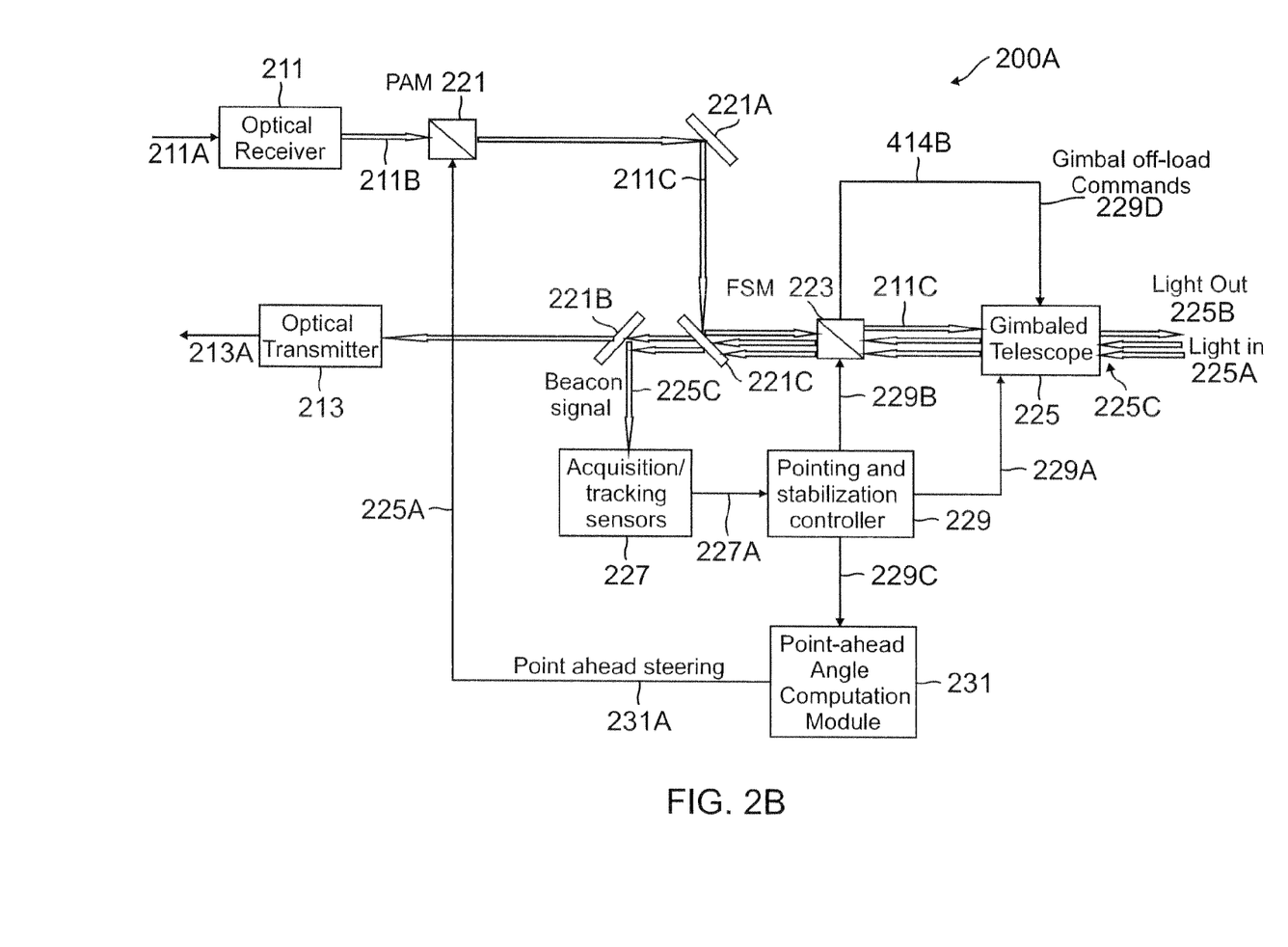
FIG. 2B shows a block diagram of a satellite telescope subsystem using a lasercom terminal, according to one embodiment.

FIG. 2B shows a block diagram of satellite telescope subsystem (STS) 200A, used according to one embodiment. STS 200A includes an optical receiver 211 that receives an optical signal 211A from other satellite and produces an output 211-B. Output 211B is sent to Point-Ahead Mirror (PAM) 221 that reflects the signal to mirror 221A. Mirror 221A reflects signal 211C to mirror 221C that in turn reflects signal 211C to Fast Steerinc Mirror (FSM) 223. FSM 221 transmits signal 211C via a gimbaled telescope 225 as output 225B.

Gimbaled telescope 225 receives optical input signals (shown as 225A) from other sources. The other sources may include ground stations, other spacecrafts, or mobile aircraft or platform. Gimbaled telescope 223 provides the Azimuth and Elevation angular motion of the telescope. Incoming optical signal 225A includes a beacon signal 225C (also referred to as tracking signal) used for tracking a remote source, as described below. Input signal 225A propagates via FSM 223 and mirror 221B to optical transmitter 213. Optical transmitter 213 then outputs signal 213A.

STS 200A further includes acquisition and tracking sensors 227 (or module 227) used for tracking the signal 225A source. Module 227 acquires beacon signal 225C from gimbaled telescope 225. Module 227 produces an output 227A that is sent to a point and stabilization controller 229 (or controller 229).

Controller 239 produces fine steering commands that are sent to FSM 223; and coarse steering commands that are sent to the gimbaled telescope 225. The gimbaled telescope 225 in conjunction with FSM 223 operates as an optical line of sight (LOS) correction device. Targeting, surveillance, and laser-based communication systems use LOS stabilization systems to compensate for vehicle motion, vibration, and drift so that images formed are not blurred.

Based on signal 227A, controller 229 produces a coarse steering command (or control signal) 2239A for steering gimbaled telescope 225 to cover the field-of-regard. Controller 229 also produces a control signal (coarse steering command) 229B that is used to control the movement of FSM 223. Gimbal off-load commands 229D are provided for off-loading the FSM motion during fine tracking. Controller 229 also provides output 229C to module 231 that generates a point-ahead steering signal 231A, which is used to control PAN 221 so that a laser beam can be accurately pointed at a moving target (aircraft 104, FIG. 1A). In one embodiment, module 231 uses a Kalman filter to determine a point-ahead signal and the process and system for determining output signal 231A is described below in detail with respect to FIGS. 3-4E.

FIG. 3 shows a geometrical representation 300 of a point-ahead angle ($\theta_p$) used for communication between satellite 102 and moving aircraft 104 (FIG. 1A), according to one embodiment. The orthogonal axes for satellite 102 are shown as X, Y and Z. As discussed above, satellite 102 initially points at aircraft 104 at position X when it has aircraft location and velocity vectors. After the aircraft moves to position X', satellite 102 has to use the point-ahead angle (shown as $\theta_p$) to communicate with aircraft 104 at position X'.

The point-ahead angle may be computed as follows:

$$\theta_p = \tan^{-1}\left\{\frac{(V\cos\theta)\Delta t}{R}\right\} \tag{1}$$

where V is the relative velocity of aircraft 104 with respect to satellite 102;

$R_L$ is a vector representing the position of aircraft 104 at position X' with respect to satellite 102; and R is a vector representing the position of aircraft 104 at position X with respect to satellite 102. Furthermore, $$\Delta t = \frac{R_L}{c} \tag{2}$$

$$= \frac{\sqrt{R^2 + \{(V\cos\theta)\Delta t\}^2}}{c}$$

$$= \frac{R}{c\sqrt{1 - \frac{V^2\cos^2\theta}{c^2}}}$$

where $\Delta t$ is the time aircraft 104 takes to move from position X to X'. $\Delta t$ is also the time for a lasercom signal to reach an aircraft from a satellite; and c is the velocity of light.

Based on the foregoing, the point-ahead angle is computed as:

$$\theta_p = \tan^{-1}\left\{\frac{(V\cos\theta)\Delta t}{R}\right\} \tag{3}$$

$$= \tan^{-1}\left\{\frac{(V\cos\theta)}{c\sqrt{1 - \frac{V^2\cos^2\theta}{c^2}}}\right\}$$

$$\approx \frac{V\cos\theta}{c}$$

The calculated point-ahead angle is used by PAM 221 to accurately track the receiving lasercom terminal of aircraft 104 at position X' while the aircraft is airborne.

Process for Determining Point-Ahead Angle

Figure 4A:
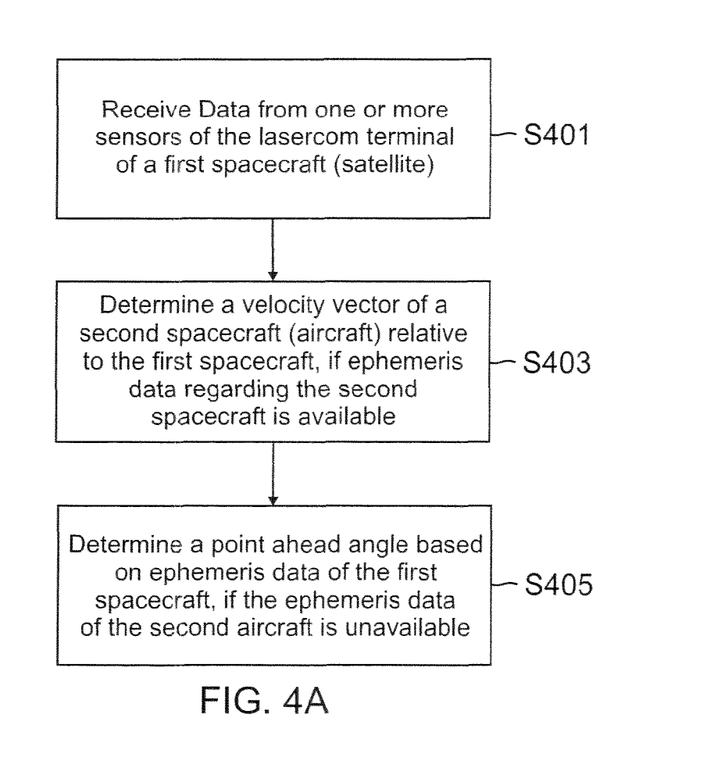
FIG. 4A shows general process steps for determining a point-ahead angle by a satellite, according to one embodiment.

FIG. 4A shows the overall process steps for determining a point-ahead angle ($\theta_p$) for a lasercom terminal at satellite 102 communicating with a lasercom terminal at aircraft 104. The process begins in step S401, when input data is received from one or more sensors of the lasercom terminal at satellite 102. Input data includes bus attitude estimate, gimbal off-load commands, and similar details that specify the location of satellite 102. In step S403, a velocity vector of the moving aircraft 104 relative to the satellite is determined, if ephemeris data regarding aircraft 104 is available.

In step S405, if ephemeris data regarding aircraft 104 is unavailable, a point-ahead angle for aircraft 104 is determined based on the ephemeris data for satellite 102. Details regarding steps S403 and S405 are provided below with respect to FIGS. 4B-4E.

Figure 4B:
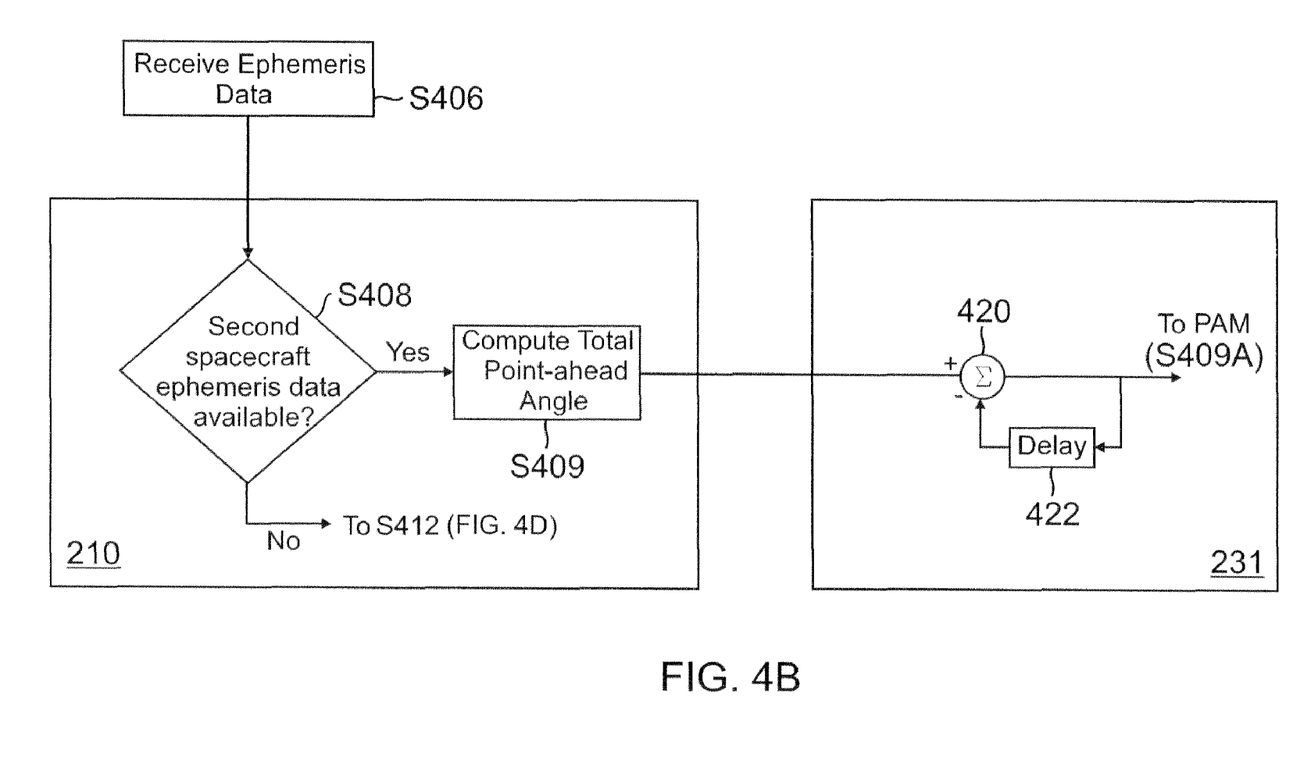
FIG. 4B shows process steps for computing a point-ahead angle from a satellite when the ephemeris of a mobile platform is available, according to an embodiment.

FIG. 4B outlines the process steps for determining a point-ahead angle for a moving aircraft (104) from a satellite (102). The process starts in step S406 when SCP 210 obtains ephemeris data from aircraft 104 at position X. SCP 210 determines if ephemeris data of the aircraft 104 at position X'(104') is also available. If ephemeris data of aircraft at position X' (104') is available, the point-ahead angle is calculated in step S409. The details for calculating the point-ahead angle of step S409 is geometrically shown in FIG. 4C.

Figure 4C:
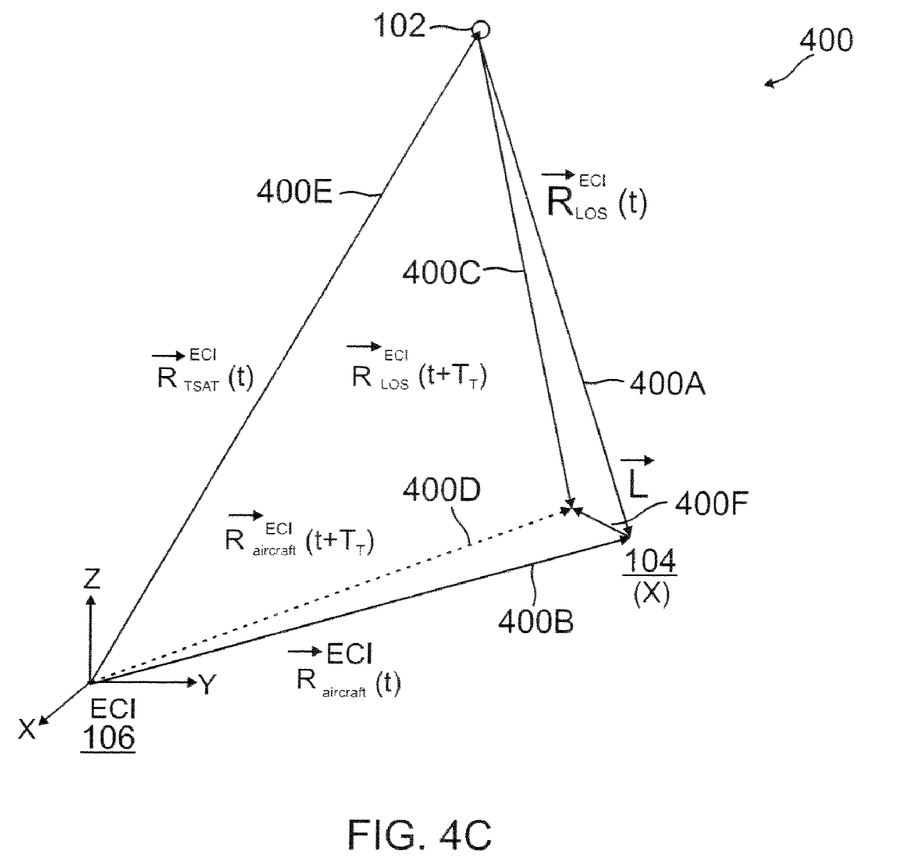
FIG. 4C shows a geometrical diagram for calculating point-ahead angle when ephemeris data is available, according to one embodiment.

FIG. 4C shows geometrical representation 400 for determining the point-ahead angle of step S409. Representation 400 may use an Earth-centered Inertial frame of reference 106 (referred to as ECI 106) with coordinate axes (X, Y, Z). A satellite ELI coordinate vector 400E ($\vec{R}_{TSAT}^{ECI}$) may represent the position of satellite 102 relative to ECI 106. Likewise, vector 400B ($\vec{R}_a^{ECI}(t)$) may represent the position of aircraft 104 relative to ECI 106. A range pointing (or line of sight (LOS) vector) 400A ($\vec{R}_{LOS}^{ECI}(t)$) may represent the position of satellite 102 relative to aircraft 104.

The LOS vector 400A ($\vec{R}_{LOS}^{ECI}(t)$) at time t is determined based on aircraft 104's ephemeris data, shown below:

$$\vec{R}_{LOS}^{ECI}(t) = \vec{R}_a^{ECI}(t-\tau) - \vec{R}_{TSAT}^{ECI}(t) \tag{4}$$

where "t" is the initial time when satellite 102 first makes contact with the aircraft; and $\tau$=Time for lasercom signal to reach an aircraft from a satellite in free space.

The point-ahead vector, $\vec{L}$ (shown as 400F) is then computed as follows:

$$\vec{L} = \vec{V}_{LOS}^{ECI} T_T + \frac{1}{2}\vec{A}_{LOS}^{ECI}(T_T)^2 \tag{5}$$

$$\text{where time delay} = \tau = T_T = \frac{|\vec{R}_{LOS}^{ECI}(t+T_T)|}{c} \tag{6}$$

$\vec{V}_{LOS}^{ECI}$ is the relative velocity vector between the first satellite and the second satellite or the moving aircraft;

$\vec{A}_{LOS}^{ECI}$ is the relative acceleration vector between the first satellite and the second satellite or the moving aircraft;

$|\vec{R}_{LOS}^{ECI}(t+T_T)|$ denotes the magnitude of the vector, $\vec{R}_{LOS}^{ECI}(t+T_T)$ The point-ahead LOS pointing vector 400C at time $t+T_T$ is calculated as $$\vec{R}_{LOS}^{ECI}(t+T_T) = \vec{R}_{LOS}^{ECI}(t) + \vec{L} \tag{7}$$

From LOS pointing vector 400A, the AZ/EL angles at time t are computed as follows:

$$AZ(t) = -\tan^{-1}\left(\frac{r_2(t)}{r_1(t)}\right); \quad EL(t) = \tan^{-1}\left(\frac{r_3(t)}{\sqrt{r_1^2(t) + r_2^2(t)}}\right) \tag{8}$$

$$\vec{r}_{LOS}^{GB}(t) = [\hat{C}_{Bus}^{GB}][\hat{C}_{ECI}^{Bus}]\frac{\vec{R}_{LOS}^{ECI}(t)}{\vec{R}_{LOS}^{ECI}(t)} \triangleq \begin{bmatrix} r_1(t) \\ r_2(t) \\ r_3(t) \end{bmatrix} \tag{9}$$

where $\hat{C}_{Bus}^{GB}$ is a 3×3 direction cosine matrix representing the attitude of the bus or spacecraft body reference frame with respect to gimbal base (GB) reference frame; and $\hat{C}_{ECI}^{Bus}$ a 3×3 direction cosine matrix representing the attitude of Earth Centered Inertial (ECI) reference frame with respect to a bus or spacecraft body reference frame.

From point-ahead LOS pointing vector 400F, the new Az/EL angles at time $t+T_T$ are computed as follows:

$$AZ(t+T_T) = -\tan^{-1}\left(\frac{r_2(t+T_T)}{r_1(t+T_T)}\right); \tag{10}$$

$$EL(t+T_T) = \tan^{-1}\left(\frac{r_3(t+T_T)}{\sqrt{r_1^2(t+T_T) + r_2^2(t+T_T)}}\right)$$

$$\vec{r}_{LOS}^{GB}(t+T_T) = [\hat{C}_{Bus}^{GB}][\hat{C}_{ECI}^{Bus}]\frac{\vec{R}_{LOS}^{ECI}(t+T_T)}{|\vec{R}_{LOS}^{ECI}(t+T_T)|} \triangleq \begin{bmatrix} r_1(t+T_T) \\ r_2(t+T_T) \\ r_3(t+T_T) \end{bmatrix} \tag{11}$$

The point-ahead AZ and EL angles are based on the difference between the two set of AZ/EL angles:

$$\Delta AZ = AZ(t+T_T) - AZ(t) \quad (12)$$

$$\Delta EL = EL(t+T_T) - EL(t) \quad (13)$$

where $\Delta AZ$ is the point-ahead azimuth angle; and
$\Delta EL$ is the point-ahead elevation angle.

Referring back to FIG. 4B, the output from step S409 is fed to a summation module 420. The summation module 420 subtracts a delayed signal (the delay time equals the computation time step) from a delay module 422 and in step S409A, the result is sent to PAM 421 which directs a transmitting beam to communicate with aircraft 104 at position X' (FIG. 1A).

If aircraft 104 ephermis data is unavailable in step S408, then the process moves to step S413, which is described below in detail with respect to FIG. 4D.

Figure 4D:
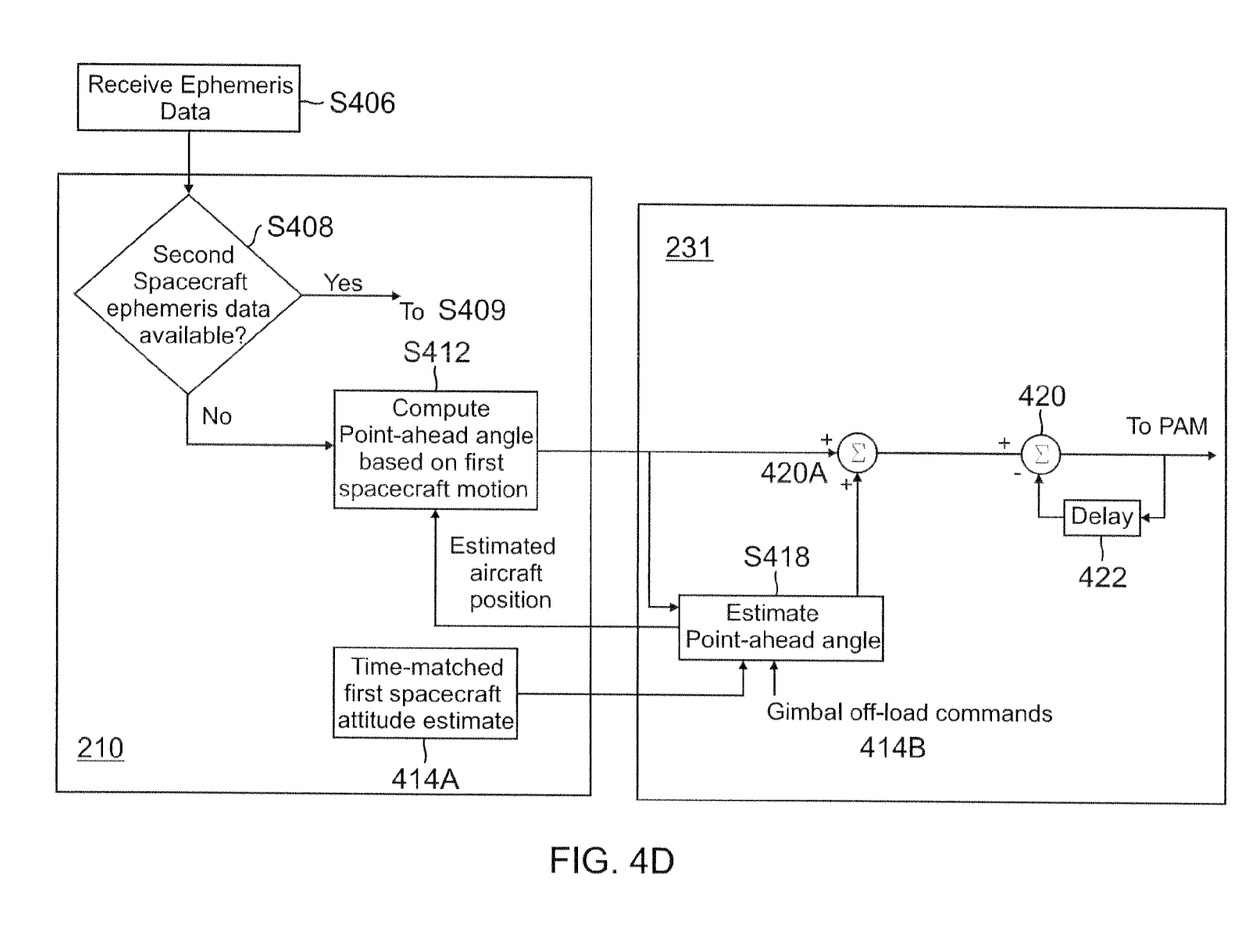
FIGS. 4D-4E show process steps for computing a point-ahead angle when ephemeris data of a target mobile platform is unavailable, according to an embodiment.

FIG. 4D shows the process steps for determining the point-ahead angle when ephemeris data for aircraft 104 is unavailable. Steps S406 and S408 are reproduced in FIG. 4D for convenience. The satellite 102 uses its own ephemeris data including attitude data for calculating the point-ahead angle.

In step S412, satellite 102's ephemeris data at any given time, is retrieved and an estimated position for aircraft 104 is obtained from module 231. The estimated position is based on an estimated point-ahead angle that is determined by module 231 in step S418, described below.

For computing the point-ahead angle the LOS pointing vector at time t, the estimated aircraft position vector and current satellite position vector are provided:

$$\vec{R}_{LOS}{}^{ECI}(t) = \hat{R}_a{}^{ECI} - \vec{R}_{TSAT}{}^{ECI}(t) \quad (14)$$

$\hat{R}_a{}^{ECI}$: estimated aircraft position vector $\vec{R}_{TSAT}{}^{ECI}(t)$: current spacecraft position vector Based on the current LOS pointing vector, the AZ and EL point-ahead angles are computed as follows:

$$AZ(t) = -\tan^{-1}\left(\frac{r_2(t)}{r_1(t)}\right); EL(t) = \tan^{-1}\left(\frac{r_3(t)}{\sqrt{r_1^2(t) + r_2^2(t)}}\right) \quad (15)$$

$$\vec{r}_{LOS}^{GB}(t) = [\hat{C}_{Bus}^{GB}][\hat{C}_{ECI}^{Bus}]\frac{\vec{R}_{LOS}^{ECI}(t)}{|\vec{R}_{LOS}^{ECI}(t)|} = \begin{bmatrix} r_1(t) \\ r_2(t) \\ r_3(t) \end{bmatrix} \quad (16)$$

In step S418, module 231 determines an estimate of the point-ahead angle. The estimate is based on various inputs, for example, point-ahead calculation module 231 uses time matched spacecraft attitude estimate (shown as 414A) from SCP 210 and gimbal off-load commands (shown as 414P) from FSM 223 and STS 200A gimbal measurements. The updated estimate is constantly fed to SCP 210 at the computation time step; so that the estimate can be used in step S412

During a fine tracking mode, the off-load gimbal angles (or commands) provided by the FSM/Track Sensor are equal to the relative angular motion between satellite 102 and aircraft 104 assuming that the STS gimbal compensates for the bus angular motion during the fine track mode. In other words, $$\theta_{off-load}(t) = \theta(t-T_R) + \Delta\theta_{jitter} + n(t) \quad (17)$$

$$\theta(t-T_R) = \theta_{SC}(t-T_R) - \theta_T(t-T_R) \quad (18)$$

Where $T_R$ (~$T_T$) is the time delay due to finite speed of light.

Output from step S411 are sent to a summation module (shown as 420A). Summation module 420A adds the output from step S412 and the output from step S418. The added value is then sent to summation module 420 and eventually sent to PAM 221 in step S412A.

Figure 4E:
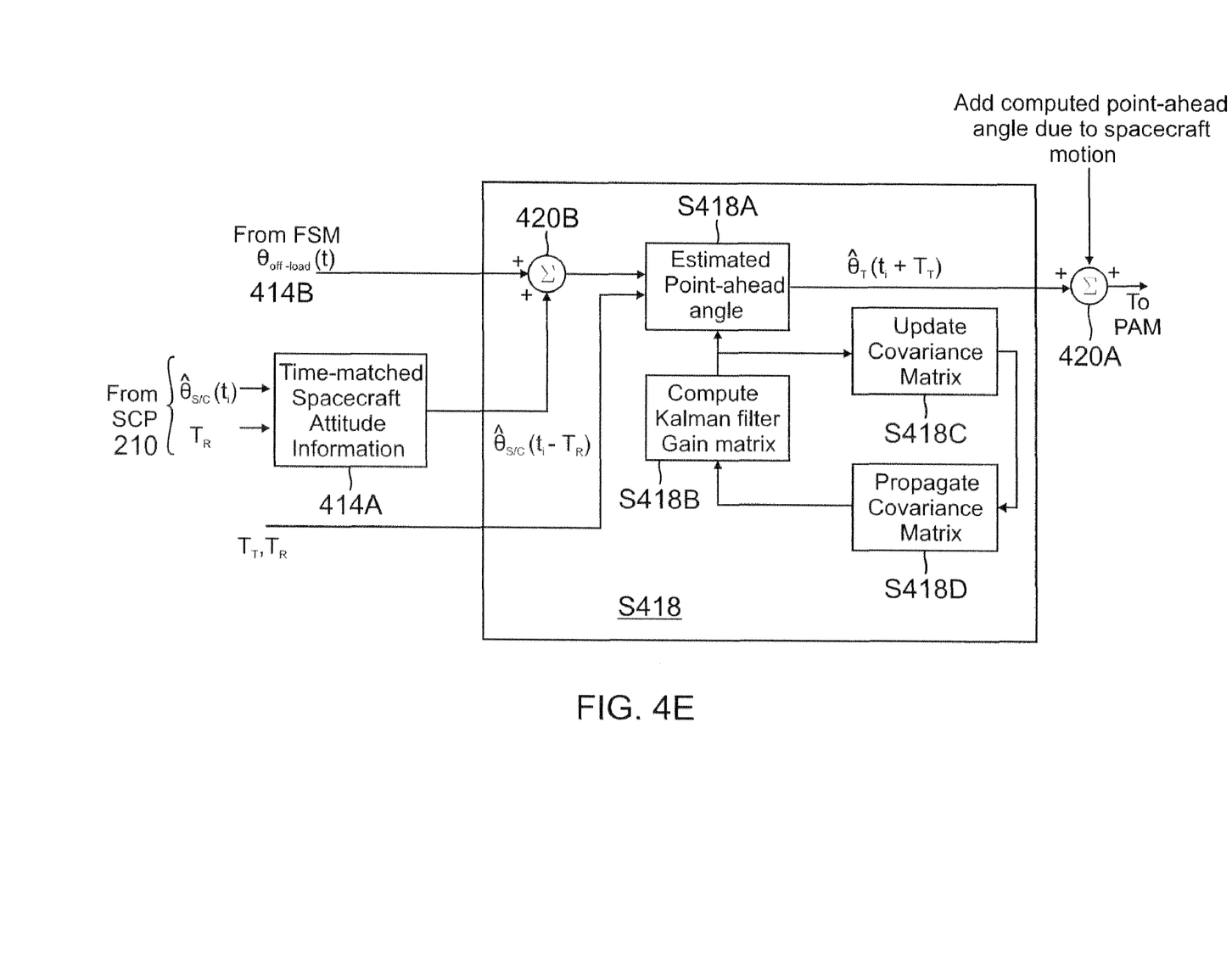

Point-ahead calculation module 731 uses Kalman filter for estimating the point-ahead angle $\theta_T(t+T_T)$ in Step S418. FIG. 4E shows the various process steps within step S418.

As shown in FIG. 4E, SCP 210 provides input 414A and FSM 223 provides input 414B to summation module 420E. Output from summation module 420B and input from sub-steps S418B (Kalman filter gain matrix computation) S4183 (covariance matrix update) and S418D (covariance matrix propagation) are also provided to step S418A. These are then used for performing the point-ahead calculation in Step S418A.

A Kalman filter in module 231 performs the following measurement functions:

$$z(t) = \theta_{off-load}(t) + \hat{\theta}_{S/C}(t) = \theta_T(t-T_R) - \{\theta_{SC}(t-T_R) - \hat{\theta}_{SC}(t-T_R)\} + n(t) + \Delta\theta_{jitter}) \quad (19)$$

where $\theta_T(t-T_R)$ is the true received target angle of aircraft terminal at time equals $t-T_R$;

$\theta_{SC}$ is the true spacecraft attitude; and $\hat{\theta}_{SC}$ is time-matched spacecraft attitude The Kalman filter also defines state variables (3 states) and derives dynamic and measurement equations:

$$F = \begin{bmatrix} 0 & 1 & 0 \\ 0 & 0 & 1 \\ 0 & 0 & 0 \end{bmatrix}; \quad (20)$$

$$G = \begin{bmatrix} 0 \\ 0 \\ 1 \end{bmatrix};$$

$\omega$ = process noise representing air turbulence $$\begin{aligned} x_1 &= \theta_T(t - T_R) \\ x_2 &= \dot{\theta}_T(t - T_R) \\ x_3 &= \ddot{\theta}_T(t - T_R) \end{aligned} \quad (21)$$

$$\dot{\vec{x}} = \begin{bmatrix} \dot{x}_1 \\ \dot{x}_2 \\ \dot{x}_3 \end{bmatrix}$$

$$= \begin{bmatrix} 0 & 1 & 0 \\ 0 & 0 & 1 \\ 0 & 0 & 0 \end{bmatrix} \begin{bmatrix} x_1 \\ x_2 \\ x_3 \end{bmatrix} + \begin{bmatrix} 0 \\ 0 \\ 1 \end{bmatrix} \omega$$

$$= [F]\vec{x} + [G]\omega$$

$$z = \theta_T(t - T_R) + \tilde{n}(t) = x_1(t) + \tilde{n}(t) \quad (22)$$

$$= [1 \; 0 \; 0] \begin{bmatrix} x_1 \\ x_2 \\ x_3 \end{bmatrix} + \tilde{n}(t) = [H]\vec{x} + \tilde{n} \quad (23)$$

$\tilde{n}$ = measurement noise $\quad (24)$ $$= -\{\theta_{SC}(t - T_R) - \hat{\theta}_{SC}(t - T_R)\} + n(t) + \Delta\theta_{jitter}$$

Discrete Kalman filter implementation includes:

$$\vec{x}(k+1) = \Phi(\Delta t)\vec{x}(k) + \Gamma(\Delta t)\omega(k) \quad (25)$$

$$\Phi(\Delta t) = e^{F\Delta t} = I_{3\times 3} + F\Delta t + \frac{(\Delta t)^2}{2}F^2 + \ldots = \begin{bmatrix} 1 & \Delta t & \frac{\Delta t^2}{2} \\ 0 & 1 & \Delta t \\ 0 & 0 & 1 \end{bmatrix} \quad (26)$$

$$\Gamma(\Delta t) = \int_0^{\Delta t} [\Phi(\tau_1)] \begin{bmatrix} 0 \\ 0 \\ 1 \end{bmatrix} d\tau_1 = \begin{bmatrix} \frac{(\Delta t)^3}{6} \\ \frac{(\Delta t)^2}{2} \\ \Delta t \end{bmatrix} \quad (27)$$

$$E[\omega^2] = \frac{\{amp*(2*\pi*\text{ft})^3\}^2}{2} \quad (28)$$

amp: amplitude of air turbulence in meters
ft: air turbulence frequency in Hz
Δt: Kalman filter update period (or computation time step) in seconds Based on the above state equations and measurement equations, one can implement a Kalman filter to estimate the state vector, $\hat{x}(t)$, which can then be used to estimate the point-head angle $$\hat{\theta}_T(t + T_T) = \hat{x}_1(t) + (T_R + T_T)\hat{x}_2(t) + \frac{(T_R + T_T)^2}{2}\hat{x}_3(t) \quad (29)$$

Point-ahead angle calculation in step S418A includes:
1. Determine μ

$$\hat{z}(k|k-1) = H\hat{x}(k|k-1) \quad (30)$$

$$\mu = (z(k) - \hat{z}(k|k-1)) \quad (31)$$

2. Correct state variable $$\hat{x}(k|k) = \Phi(\Delta t)\hat{x}(k-1|k-1) + \Delta x = \begin{bmatrix} \hat{x}_1 \\ \hat{x}_2 \\ \hat{x}_2 \end{bmatrix} \quad (32)$$

$$\Delta x = K\mu \quad (33)$$

3. Compute point-ahead angle $$\hat{\theta}_T(t + T_T) = \hat{x}_1 + (T_R + T_T)\hat{x}_2 + \frac{(T_R + T_T)^2}{2}\hat{x}_3 \quad (34)$$

In step S418B, the Kalman filter gain matrix is computed as follows:

$$K = P(k|k-1)H^T(HP(k|k-1)H^T + R)^{-1} \quad (35)$$

where P: 3×3 error covariance matrix
where R: measurement error variance
In step S418C, the covariance matrix is updated as follows:

$$P(k|k) = (I - KH)P(k|k-1) \quad (36)$$

In step S418D the updated covariance matrix is propagated as follows:

$$P(k|k-1) = \Phi(\Delta t)P(k-1|k-1)\Phi(\Delta t)^T + Q \quad (37)$$

$$Q: 3\times 3 \text{ process noise covariance matrix} = \begin{bmatrix} 0 & 0 & 0 \\ 0 & 0 & 0 \\ 0 & 0 & E[\omega^2] \end{bmatrix}$$

Output from step S418 is added by summation module 420A with a point-ahead angle based on the satellite 102 motion. The combined value is used to control PAM 221.

In one embodiment, a first spacecraft is able to accurately determine a point-ahead angle to communicate with a mobile, second spacecraft, without having access to the ephemeris data of the second spacecraft.

Although the foregoing disclosure has been described with reference to specific embodiments, these embodiments are illustrative only and not limiting. Many other applications and embodiments will be apparent in light of this disclosure and the following claims.

What is claimed is:

1. A method for determining a point-ahead angle from a first spacecraft to a second spacecraft, each spacecraft having a laser communication ("lasercom") terminal, comprising:
   if ephemeris data regarding the second spacecraft is unavailable to the first spacecraft while the second spacecraft is mobile, (a) obtaining attitude information regarding the first spacecraft; and (b) obtaining gimbal offload commands from a fast steering mirror and a first spacecraft telescope subsystem of the first spacecraft; wherein a point-ahead determination module receives the attitude information and the gimbal offload commands; and
   determining an estimate of the point-ahead angle from the first spacecraft to the second spacecraft based on the attitude information and the gimbal offload commands.

2. The method of claim 1, further comprising:
   determining a velocity vector of the second spacecraft relative to the first spacecraft, if ephemeris data regarding the second spacecraft is available to the first spacecraft, while the second spacecraft is mobile; and
   determining the point-ahead angle for the first spacecraft based on the velocity vector of the second spacecraft.

3. The method of claim 1, wherein position data of a fast steering mirror of the first spacecraft is used for estimating the point-ahead angle.

4. The method of claim 1, wherein sensor data from a tracking nutator sensor of the first spacecraft is used for estimating the point-ahead angle.

5. The method of claim 1, wherein data from a gimbal resolving sensor of the first spacecraft is used for estimating the point-ahead angle.

6. The method of claim 1, wherein the first spacecraft is a satellite.

7. The method of claim 1, wherein the second spacecraft is an aircraft.

8. The method of claim 1, wherein a Kalman filter is used by the point-ahead determination module for estimating the point-ahead angle.

9. The method of claim 1, wherein the point-ahead angle is used by a point-ahead mirror for transmitting a laser beam from the first spacecraft to the second spacecraft, while the second spacecraft is mobile.

10. The method of claim 1, wherein a Kalman filter is used by a point-ahead determination module for estimating the point-ahead angle.

11. The method of claim 1, wherein the point-ahead angle is used by a point-ahead mirror for transmitting a laser beam from the first spacecraft to the second spacecraft, while the second spacecraft is mobile.

12. A method for determining a point-ahead angle from a first spacecraft to a second spacecraft, each spacecraft having a lasercom terminal, comprising:
   acquiring initial ephemeris data of the second spacecraft at an initial position;
   determining if the ephemeris data of the second spacecraft is available, after the second spacecraft has moved from the initial position to a new position; and
   if the ephemeris data of the second spacecraft at the new position is unavailable, determining a point-ahead angle based on ephemeris data of the first spacecraft.

13. The method of claim 12, wherein time matched first spacecraft attitude information and gimbal off-load commands from the first spacecraft are used for estimating the point-ahead angle.

14. The method of claim 12, further comprising:
   determining a velocity vector of the second spacecraft relative to the first spacecraft, if ephemeris data regarding the second spacecraft is available to the first spacecraft, while the second spacecraft is mobile; and
   determining the point-ahead angle for the first spacecraft based on the velocity vector of the second spacecraft.

15. The method of claim 12, wherein position data of a fast steering mirror of the first spacecraft; sensor data from a tracking nutator sensor of the first spacecraft; and data from a gimbal resolving sensor of the first spacecraft are used for estimating the point-ahead angle.

16. The method of claim 12, wherein the first spacecraft is a satellite.

17. The method of claim 12, wherein the second spacecraft is an aircraft.

18. A system for determining a point-ahead angle, comprising:
   a first spacecraft having a lasercom terminal; and
   a second spacecraft having a lasercom terminal, wherein the first spacecraft and the second spacecraft communicate with each other and the point-ahead angle is determined from the first spacecraft to the second spacecraft; and
   wherein the first spacecraft includes a point-ahead determination module for estimating the point-ahead angle based on attitude information of the first spacecraft and gimbal offload commands obtained from a fast steering mirror and a first spacecraft telescope subsystem of the first spacecraft.

19. The system of claim 18, wherein the first spacecraft is a satellite.

20. The system of claim 18, wherein the second spacecraft is an aircraft.

21. The system of claim 18, wherein a Kalman filter is used by the point-ahead determination module for estimating the point-ahead angle.

* * * * *